United States Patent [19]

Teramoto

[11] Patent Number: 5,076,693
[45] Date of Patent: Dec. 31, 1991

[54] OPTICAL CONTOUR MEASURING APPARATUS

[75] Inventor: Takuji Teramoto, Nagoya, Japan

[73] Assignee: Brother Kogyo Kabushiki Kaisha, Japan

[21] Appl. No.: 540,708

[22] Filed: Jun. 20, 1990

[30] Foreign Application Priority Data

Jul. 5, 1989 [JP] Japan .................................. 1-173743

[51] Int. Cl.$^5$ .................................................. G01B 9/02
[52] U.S. Cl. .................................... 356/349; 356/376; 356/371; 356/358; 356/73
[58] Field of Search ............... 356/349, 358, 73, 371, 356/376

[56] References Cited

U.S. PATENT DOCUMENTS

| 4,708,483 | 11/1987 | Lorenz ................................ 356/376 |
| 4,803,374 | 2/1989 | Monfort ............................. 356/371 |
| 4,912,530 | 3/1990 | Bessho ............................... 356/351 |

OTHER PUBLICATIONS

"Angstrom Resolution Optical Profilometry for Microscopic Objects" Franco Laeri et al., Applied Optics, vol. 26, No. 11, Jun. 1987, pp. 2245-2249.
"Optical Heterodyne Profilometry", Gary E. Sommargren, Applied Optics, vol. 20, No. 4, Feb. 1981, pp. 610-618.

*Primary Examiner*—Samuel Turner
*Assistant Examiner*—Richard Kurtz
*Attorney, Agent, or Firm*—Oliff & Berridge

[57] ABSTRACT

An optical contour measuring apparatus comprises: a light source capable of radiating two superposed orthogonally polarized light beams of different frequencies; a first optical sensing means for detecting an optical beat generated by the superposition of the two orthogonally polarized light beams radiated by the light source; a polarizing beam splitting means for dividing the two superposed orthogonally polarized light beams radiated by the light source, according to the direction of polarization; a second optical sensor for detecting an optical beat generated by the superposition of one polarized light beam divided by the polarizing beam splitter, and another polarized light beam divided by the polarizing beam splitter means and reflected by a surface of an object to be measured; a position detector for detecting the position of reception of another polarized light beam divided by the polarizing beam splitter and reflected by the surface of the object; and a microcomputer. The microcomputer detects the height of the surface of the object on the basis of the phase difference between the phase of a beat signal provided by the first optical sensor and the phase of a beat signal provided by the second optical sensor. The microcomputer also detects the height of the surface of the object on the basis of the position detected by the position detecting means.

7 Claims, 5 Drawing Sheets

F I G. 1
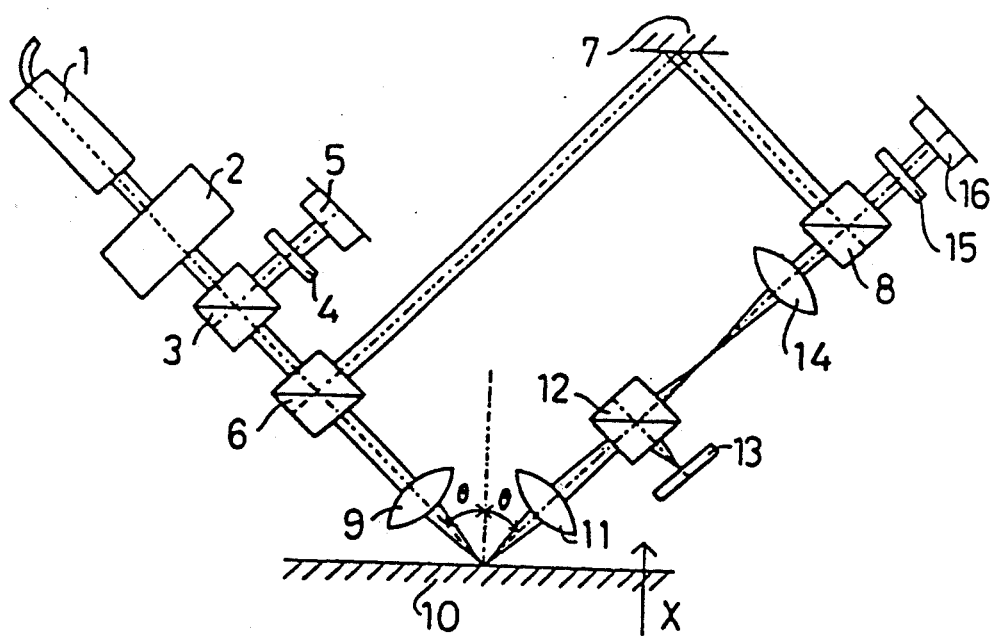

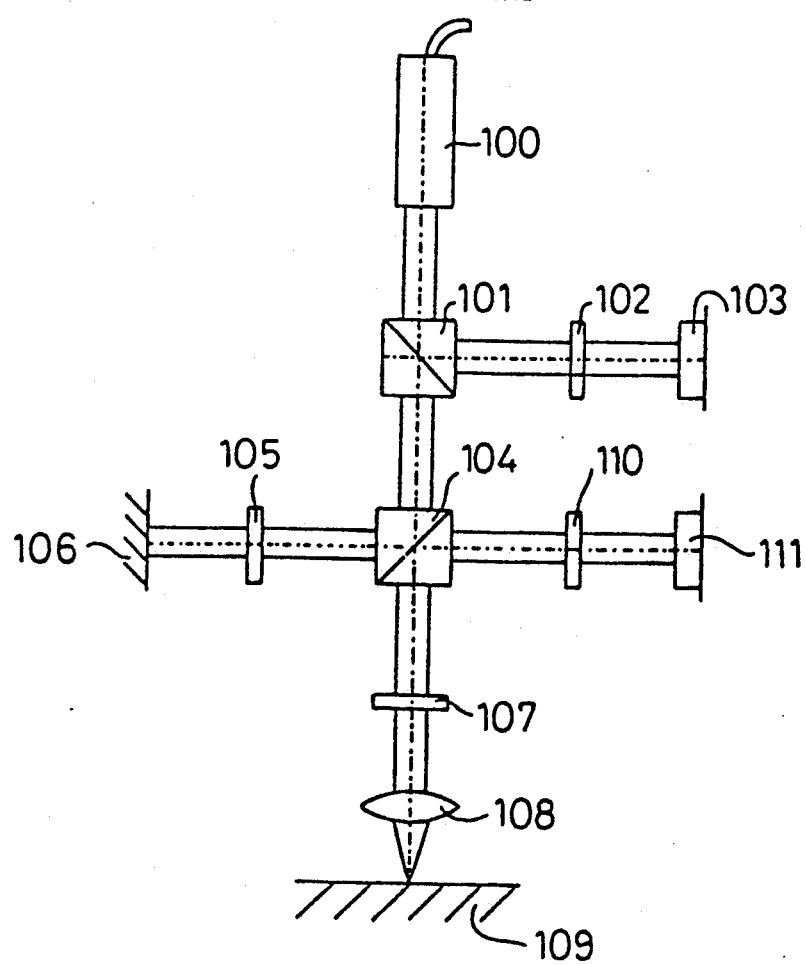

OPTICAL CONTOUR MEASURING APPARATUS

BACKGROUND OF THE INVENTION

1. Field of the Invention

The present invention relates to an optical contour measuring apparatus for optically measuring the contour of an object.

2. Description of the Related Art

FIG. 5 shows the optical system of a contour measuring apparatus utilizing optical heterodyne interference. A Zeeman laser 100 serving as a light source radiates two superposed orthogonally polarized light beams of slightly different frequencies. The radiated light beams are divided by a nonpolarizing beam splitter 101. Portions of the light beams travel through a polarizer 102 and fall on an optical sensor 103. The optical sensor 103 provides a beat frequency signal representing the frequency of a beat generated by the combination of the two light beams of slightly different frequencies. The other portions of the light beams are divided into polarized light beams having a plane of oscillation parallel to the polarizing sheet (P-polarized beams) and polarized light beams having a plane of oscillation perpendicular to the sheet (S-polarized beams). The S-polarized beams traveled through a $\frac{1}{4}$-waveplate 105 are reflected by a mirror 106, and the reflected S-polarized beams fall again on a polarizing beam splitter 104. The P-polarized beams traveled through a $\frac{1}{4}$-waveplate 107 are focused by an objective lens 108 on the surface of an object 109. Then, the P-polarized beams reflected by the surface of the object 109 travel through the objective lens 108 and the $\frac{1}{4}$-waveplate 107 and fall on the polarizing beam splitter 104. The reflected S and P-polarized beams traveled through a polarizer 110 fall on an optical sensor 111. Then, the optical sensor 111 provides a beat frequency signal representing the frequency of a beat generated by the combination of the light beams of slightly different frequencies. The beat frequency signal provided by the optical sensor 103 and that provided by the optical sensor 111 have different phases, respectively. Since the phase difference between the respective phases of the beat frequency signals varies according to the contour of the object 109, the contour of the object 109 can be measured through the measurement of the variation of the phase difference.

This conventional contour measuring apparatus is able to measure the contour of the object 109 at a very high accuracy provided that the surface of the object 109 is smooth, but is unable to measure the contour at a satisfactory accuracy when the surface of the object 109 is rough because the light beam is reflected irregularly by the rough surface of the object 109 and hence the wavefront of the light beam is disturbed, so that accurate detection of the beat frequency is impossible.

A trigonometric contour measuring apparatus has been proposed for the measurement of the contour of an object having a rough surface, but the measuring accuracy of the trigonometric contour measuring apparatus is unsatisfactory, and the dimensions of the apparatus are increased inevitably when the resolution of the apparatus is enhanced for accurate measurement.

SUMMARY OF THE INVENTION

Accordingly, it is an object of the present invention to provide an optical contour measuring apparatus capable of accurately measuring the contour of an object regardless of the degree of surface roughness of the object.

To achieve the object, the present invention provides in one aspect an optical contour measuring apparatus which comprises: a light source capable of radiating two superposed light beams of different frequencies; a first optical sensing means for detecting an optical beat generated by the superposition of the two light beams radiated by the light source; a second optical sensing means for detecting an optical beat generated by the superposition of one of the light beams radiated by the light source, and the other light beam radiated by the light source and reflected by a surface of an object to be measured; a first height detecting means for detecting a height of the surface of the object on the basis of a phase difference between the phase of a beat signal provided by the first optical sensing means and the phase of a beat signal provided by the second optical sensing means; a position detecting means for detecting a position of reception of the other light beam radiated by the light source and reflected by the surface of the object; and a second height detecting means for detecting the height of the surface of the object on the basis of the position detected by the position detecting means.

BRIEF DESCRIPTION OF THE DRAWINGS

The above and other objects, features and advantages of the present invention will become more apparent from the following description taken in connection with the accompanying drawings, in which:

FIG. 1 is a diagrammatic illustration of an optical system employed in an optical contour measuring apparatus in a preferred embodiment according to the present invention;

FIG. 5 is a diagrammatic illustration of an optical system employed in a conventional optical contour measuring apparatus.

DETAILED DESCRIPTION OF THE PREFERRED EMBODIMENT

Figure 2:
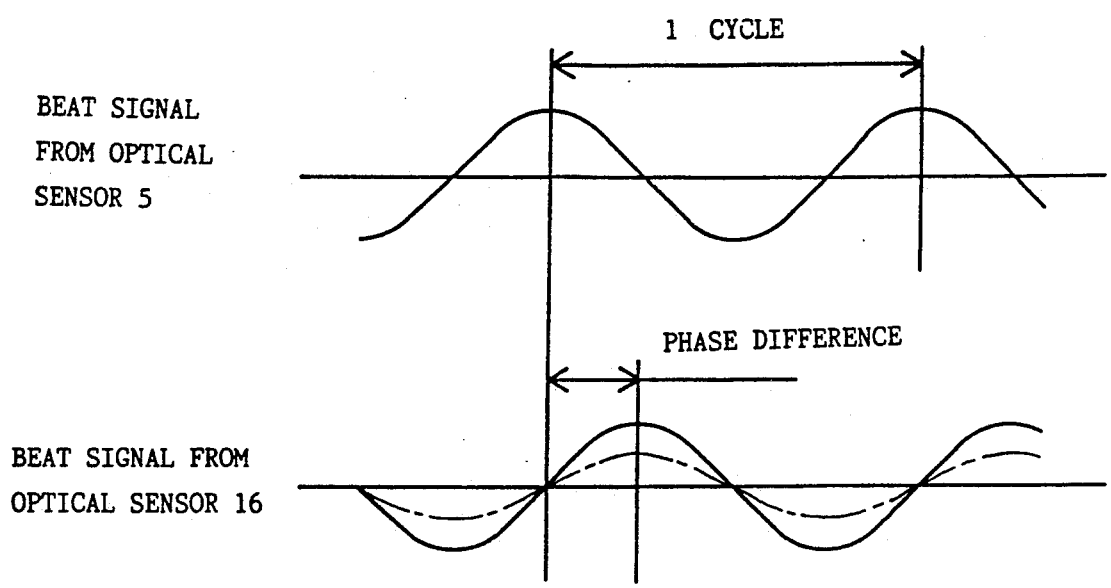
FIG. 2 is a graph showing beat signals provided by an optical sensor included in the optical contour measuring apparatus of FIG. 1.

Referring to FIG. 1, a linearly polarized beam radiated by a He-Ne laser 1 as a light source falls on an optical frequency shifter 2, and then the optical frequency shifter 2 radiates two superposed orthogonally polarized beams of light of slightly different frequencies on a nonpolarizing beam splitter 3. The nonpolarizing beam splitter 3 divides the two superposed orthogonally polarized beams of slightly different frequencies. Portions of the two orthogonally polarized beams of slightly different frequencies divided by the nonpolarizing beam splitter 3 are caused to interfere with each other as they travel through a polarizer 4 to an optical sensor 5. The optical sensor 5 provides a beat frequency signal produced by the superposition of the two orthogonally polarized beams of slightly different frequencies. The other portions of the orthogonally polarized beams of slightly different frequencies divided by the nonpolarizing beam splitter 3 are divided into a P-polarized beam having a plane of oscillation parallel to the polarizing sheet and an S-polarized beam having a plane of oscillation perpendicular to the sheet by a polarizing beam splitter 6. Then, the S-polarized beam is reflected by a mirror 7 toward a polarizing beam splitter 8. The P-polarized beam is focused by a convex objective lens 9 on the surface of an object 10. The P-polarized beam reflected by the surface of the object 10 is condensed by a condenser lens 11 and travels to a nonpolarizing beam splitter 12. Then, the nonpolarizing beam splitter 12 divides the P-polarized beam into two P-polarized beams, namely, a $P_1$-polarized beam and a $P_2$-polarized beam. The $P_1$-polarized beam falls on a position detector 13, which in turn detects the point of incidence of the $P_1$-polarized beam. The $P_2$-polarized beam falls on the polarizing beam splitter 8 after being converted into a parallel beam by an optical lens 14. Thus, the S-polarized beam and the $P_2$-polarized beam reflected by the surface of the object 10 fall on the polarizing beam splitter 8. The S-polarized beam and the $P_2$-polarized beam are caused to interfere with each other by a polarizer 15, and then an optical sensor 16 provides a beat frequency signal produced by the superposition of the S-polarized beam and the $P_2$-polarized beam.

Figure 4:
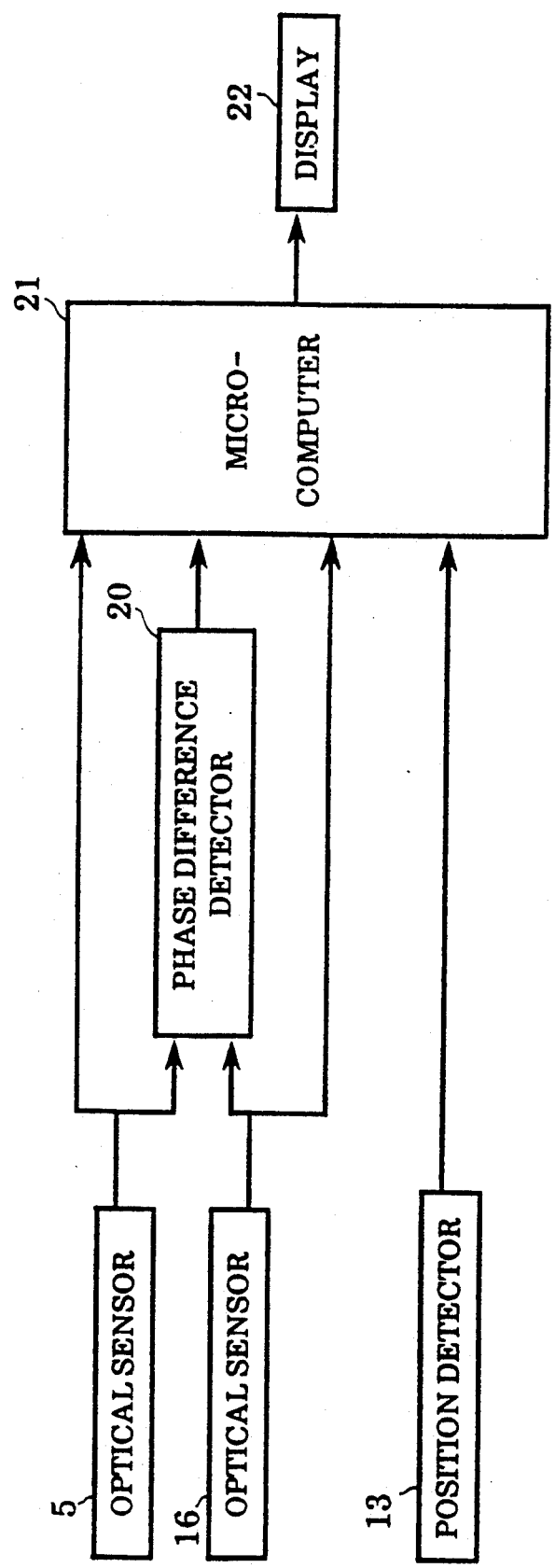
FIG. 4 is a block diagram of the electrical configuration of the optical contour measuring apparatus of FIG. 1.

Referring to FIG. 4, the optical sensors 5 and 16 are connected directly to microcomputer 21 and are also connected to the microcomputer 21 through a phase difference detector 20. The position detector 13 and a display 22 are connected to the microcomputer 21. The optical sensors 5 and 16 give beat frequency signals as shown in FIG. 2 to the phase difference detector 20. Then, the phase difference detector 20 detects the phase difference between the phases of the two input beat frequency signals, and gives a phase difference signal representing the detected phase difference to the microcomputer 21. The solid line in the lower graph of FIG. 2 indicates a signal from sensor 16 when the surface of the object 10 is smooth. The broken line indicates a signal of smaller amplitude output from sensor 16 when the surface of object 10 is rough.

Figure 3:
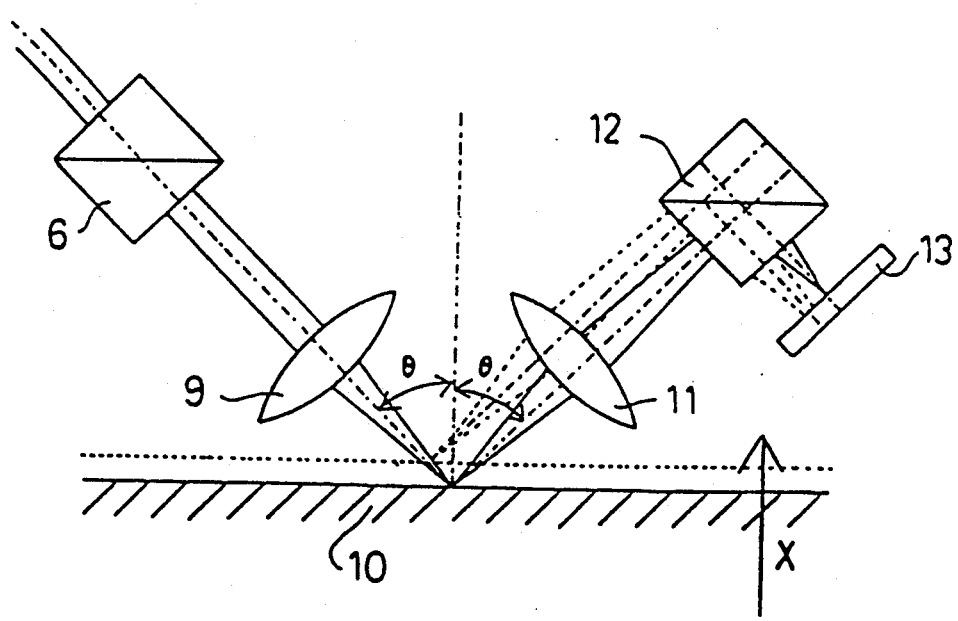
FIG. 3 is a diagrammatic illustration of assistance in explaining the measuring principle on which the optical contour measuring apparatus of FIG. 1 is based.

Referring to FIG. 3, a variation in the optical path length of the P-polarized beam corresponding to a variation in the height of the surface of the object 10 is expressed by:

$$\Delta l = 2 \cdot \Delta x \cdot \cos \theta \qquad (1)$$

where $\Delta l$ is a variation in the optical path length of the P-polarized beam, $\Delta x$ is a variation in the height of the surface of the object 10, and $\theta$ is the angle of incidence of the P-polarized beam to the surface of the object 10. A variation of $\lambda$ in the optical path length of the P-polarized beam causes the phase of the beat frequency signal to vary by $2\pi$. Therefore, $$\Delta \Phi = \Delta l \cdot 2\pi / \lambda \qquad (2)$$

where $\Delta \Phi$ is a phase variation and $\Delta l$ is a variation in the optical light path. Accordingly, from expressions (1) and (2), $$\Delta x = (\lambda/2)(1/\cos \theta)(\Delta \Phi / 2\pi) \qquad (3)$$

The microcomputer 21 judges, based on two beat frequency signals from the optical sensors 5 and 16, which signal is used to indicate the height of the surface of the object 10, the phase difference signal from the phase difference detector 20 or the incidence position signal from the position detector 13. Namely, the microcomputer 21 selects the phase difference signal when the peak difference value PD1 between the upper limit and the lower limit of the beat frequency signal from optical sensor 16 is equal to or more than half of the peak difference value PD2 between the upper limit and the lower limit of the beat frequency signal from the optical sensor 5. The microcomputer 21 selects the incidence position signal when the peak difference value PD1 is less than half of the peak difference value PD2.

When the surface of the object 10 is smooth and the microcomputer 21 judges that the peak difference value PD1 is equal to or more than half of the peak difference value PD2, the microcomputer 21 calculates the height of the surface of the object 10 by using the phase difference signal provided by the phase difference detector 20 and the expression (3) and displays the result of the calculation on the display 22.

The position detector 13 detects the point of incidence of the $P_1$-polarized beam and gives an incidence point signal representing the point of incidence of the $P_1$-polarized beam to the microcomputer 21. As shown in FIG. 3, the point of incidence of the $P_1$-polarized beam on the position detector 13 varies according to the variation of the height of the surface of the object 10. The variation $\Delta x$ of the height of the surface of the object is expressed by:

$$\Delta x = (\Delta d / M)(\tfrac{1}{2} \sin \theta) \qquad (4)$$

where $\Delta d$ is a variation in the position of incidence of the $P_1$-polarized beam on the position detector 13 and M is the lateral magnification of the condenser lens 11.

When the surface of the object 10 is so rough that the amount of light received by the optical sensor 16 is decreased due to irregular reflection on the surface of the object 10 and the microcomputer 21 judges that the peak difference value PD1 is less than half of the peak difference value PD2, the microcomputer 21 calculates the height of the surface of the object 10 by using the incidence position signal provided by the position detector 13 and the expression (4) and displays the result of the calculation on the display 22. The trigonometric detection of the height of the surface of the object 10 using the position detector 13 is possible only if the $P_1$-polarized beam falls on the position detector 13. Accordingly, the height of the surface of the object 10 can surely be detected, though the measuring accuracy is not very high, even if the surface of the object 10 is rough and the wavefront of the P-polarized beam reflected by the rough surface of the object 10 is disturbed.

As is apparent from the foregoing description, this embodiment comprises an optical system utilizing optical heterodyne interference and an optical system utilizing triangulation. Therefore, the optical contour measuring apparatus of the present invention is simple in construction and is capable of measuring the contours of objects of different surface conditions in a wide range of roughness.

The present invention is not limited in the practical application to the specific embodiment, but may be practiced otherwise than as specifically described herein without departing from the scope and spirit thereof. For example, a Zeeman laser capable of emitting two orthogonally polarized beams may be used instead of the He-Ne Laser 1 and the optical frequency shifter 2.

What is claimed is:

1. An optical contour measuring apparatus comprising:
   a light source capable of radiating two superposed light beams of different frequencies;
   a first optical sensing means for detecting an optical beat generated by the superposition of the two light beams radiated by said light source;
   a second optical sensing means for detecting an optical beat generated by the superposition of one of the light beams radiated by said light source, and the other light beam radiated by said light source and reflected by a surface of an object to be measured;
   a first height detecting means for detecting a height of the surface of the object on the basis of the phase difference between the phase of a beat signal provided by said first optical sensing means and the phase of a beat signal provided by said second optical sensing means;
   a position detecting means for detecting the position of reception of the other light beam radiated by said light source and reflected by the surface of the object; and
   a second height detecting means for detecting the height of the surface of the object on the basis of the position detected by said position detecting means.

2. The optical contour measuring apparatus according to claim 1, further comprising means for deciding which of said first and second height detecting means is used for a given measurement, based upon an amplitude of light detected by said second optical sensing means.

3. An optical contour measuring apparatus comprising:
   a light source capable of radiating two superposed orthogonally polarized light beams of different frequencies, such that each of said two polarized light beams has a direction of polarization orthogonal to the other of said two polarized light beams;
   a first optical sensing means for detecting an optical beat generated by the superposition of the two orthogonally polarized light beams radiated by said light source;
   a polarizing beam splitting means for dividing the two superposed orthogonally polarized light beams radiated by said light source, according to the direction of polarization;
   a second optical sensing means for detecting an optical beat generated by the superposition of one polarized light beam divided by said polarizing beam splitting means, and another polarized light beam divided by said polarizing beam splitting means and reflected by a surface of an object to be measured;
   a first height detecting means for detecting a height of the surface of the object on the basis of a phase difference between the phase of a beat signal provided by said first optical sensing means and the phase of a beat signal provided by said second optical sensing means;
   a position detecting means for detecting a position of reception of said another polarized light beam divided by said polarizing beam splitting means and reflected by the surface of the object; and
   a second height detecting means for detecting the height of the surface of the object on the basis of the position detected by said position detecting means.

4. The optical contour measuring apparatus according to claim 3, further comprising means for impinging said another light beam on said surface at an acute angle and directing the reflected light beam to said second optical sensing means and said position detecting means.

5. An optical contour measuring apparatus comprising:
   a light source capable of radiating two superposed orthogonally polarized light beams of different frequencies, such that each of said two polarized light beams has a direction of polarization orthogonal to the other of said two polarized light beams;
   a first nonpolarizing beam splitting means for dividing the two superposed orthogonally polarized light beams radiated by said light source;
   a first optical sensing means for detecting an optical beat generated by the superposition of a portion of the two superposed orthogonally polarized light beams divided by the first nonpolarizing beam splitting means;
   a polarizing beam splitting means for dividing another portion of the two superposed orthogonally polarized light beams divided by said first nonpolarizing beam splitting means, according to the direction of polarization;
   an optical radiating means for radiating one of the polarized light beams divided by said polarizing beam splitting means on the surface of an object to be measured;
   a second nonpolarizing beam splitting means for dividing the polarized light beam radiated by said optical radiating means and reflected by the surface of the object;
   a position detecting means for detecting a position of reception of one of the polarized light beams divided by said second nonpolarizing beam splitting means;
   a second optical sensing means for detecting an optical beat generated by a superposition of another polarized light beam divided by said polarizing beam splitting means and another polarized light beam divided by said second nonpolarizing beam splitting means;
   a first height detecting means for detecting a height of the surface of the object on the basis of a phase difference between the phase of a beat signal provided by said first optical sensing means and the phase of a beat signal provided by said second optical sensing means; and
   a second height detecting means for detecting the height of the surface of the object on the basis of the position detected by said position detecting means.

6. The optical contour measuring apparatus according to claim 5, wherein said light source includes a He-Ne laser for radiating a linearly polarized beam and a frequency shifter for changing the linearly polarized beam from the He-Ne laser into two superposed orthogonally polarized beams of slightly different frequencies.

7. The optical contour measuring apparatus according to claim 5, wherein said light source comprises a Zeeman laser.